(12) United States Patent
Kim et al.

(10) Patent No.: US 10,649,542 B2
(45) Date of Patent: May 12, 2020

(54) DISPLAY APPARATUS AND METHOD FOR CONTROLLING THE SAME

(71) Applicant: SAMSUNG ELECTRONICS CO., LTD., Suwon-si, Gyeonggi-do (KR)

(72) Inventors: Shin A Kim, Seongnam-si (KR); Byung Seok Soh, Yongin-si (KR); Chang Won Son, Yongin-si (KR); Ho June Yoo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 16/157,393

(22) Filed: Oct. 11, 2018

(65) Prior Publication Data
US 2019/0113982 A1    Apr. 18, 2019

(30) Foreign Application Priority Data
Oct. 12, 2017  (KR) .......................... 10-2017-0132126

(51) Int. Cl.
G06F 3/02       (2006.01)
G09G 5/02       (2006.01)
G06F 3/03       (2006.01)

(52) U.S. Cl.
CPC ............ G06F 3/021 (2013.01); G06F 3/0304 (2013.01); G09G 5/02 (2013.01); *G09G 2354/00* (2013.01); *G09G 2360/144* (2013.01)

(58) Field of Classification Search
CPC ......... G06F 3/021; G06F 3/0304; G09G 5/02; G09G 2354/00; G09G 2360/144; G09G 3/36; G02F 1/133308
See application file for complete search history.

(56) References Cited

U.S. PATENT DOCUMENTS

2008/0284716 A1* 11/2008 Edwards .............. G09G 3/3406
                                                   345/102
2009/0166510 A1*  7/2009 Park ..................... G09G 3/3406
                                                   250/205

(Continued)

FOREIGN PATENT DOCUMENTS

EP      2346232        7/2011
WO   2005/020198       3/2005
WO   2018/030628       2/2018

OTHER PUBLICATIONS

Extended European Search Report dated Feb. 28, 2019 in European Patent Application No. 18199397.3.

(Continued)

*Primary Examiner* — Andrew Sasinowski
(74) *Attorney, Agent, or Firm* — Staas & Halsey LLP

(57) ABSTRACT

A display apparatus and a method for controlling the same are disclosed. The display apparatus according to the embodiment includes an input device including a button structure and a sensor assembly configured to output different sensor values according to a movement of the button structure. According to an embodiment, the display apparatus includes a controller configured to generate a control signal based on sensor value information generated by the sensor assembly, and a display configured to provide a display based on the control signal. An embodiment of the disclosure provides a single multi-channel input device in the display in which a display screen correction function and a display screen operation function may be performed together using a color sensor applied to the input device. According to the disclosure, a simplified button structure of the display apparatus may be provided.

16 Claims, 15 Drawing Sheets

(56) References Cited

U.S. PATENT DOCUMENTS

2011/0086676 A1    4/2011   Choi et al.
2012/0295665 A1   11/2012   Pantfoerder
2017/0169749 A1    6/2017   Masuda

OTHER PUBLICATIONS

International Search Report dated Feb. 12, 2019 in International Patent Application No. PCT/KR2018/011996.

* cited by examiner

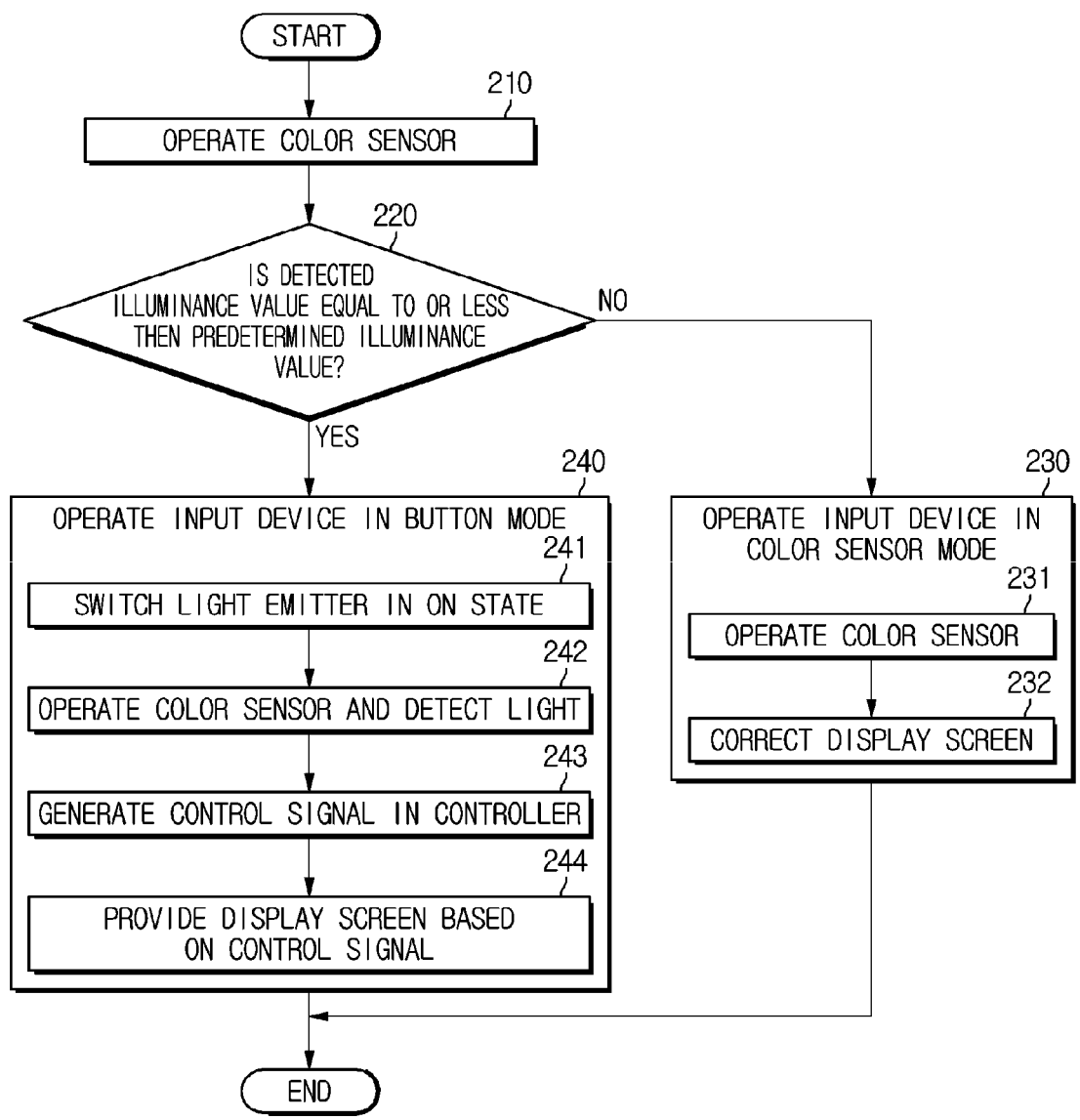

DISPLAY APPARATUS AND METHOD FOR CONTROLLING THE SAME

CROSS-REFERENCE TO RELATED APPLICATION

This application is based on and claims priority under 35 U.S.C. § 119 to Korean Patent Application No. 10-2017-0132126, filed on Oct. 12, 2017 in the Korean Intellectual Property Office, the disclosure of which is incorporated by reference in its entirety.

BACKGROUND

1. Field

Embodiments of the present disclosure relate to a display apparatus and a method for controlling the same, and more particularly, to the display apparatus having a multi-channel input device using a color sensor, and the method for controlling the same.

2. Description of the Related Art

Generally, electronic products such as a television, a washing machine, an air conditioner, and a refrigerator are provided with an operation button for user operation and a display for indicating the operation state thereof.

In recent years, as appearance of the electronic products becomes a factor that greatly affects choice of the electronic products of the consumers, various efforts are being made to make the appearance of the electronic products more luxurious and sophisticated.

As a part of this study, in the case of the television, a main button is provided on a front lower part of a bezel or on a bottom surface of a main body, and a tact button is formed around the main button to be used as a function key.

SUMMARY

Therefore, it is an aspect of the present disclosure to provide a display apparatus capable of allowing a color sensor to perform functions inherent thereto and applying the color sensor as a main component of a multi-channel input device, and a method for controlling the same.

Additional aspects of the disclosure will be set forth in part in the description which follows and, in part, will be obvious from the description, or may be learned by practice of the disclosure.

In accordance with an aspect of the present disclosure, a display apparatus includes: an input device which includes a housing; a spring provided on the inner wall of the housing; a button structure configured to be elastically supported by the spring to be movable in a predetermined direction, and in which a hole is formed and a color structure is formed around the hole; and a sensor module disposed to be spaced apart from the button structure inside the housing and provided with a light emitter configured to provide light and a color sensor configured to collect ambient light; a controller configured to generate a control signal based on sensor value information of the sensor module; and a display configured to provide a display screen based on the generated control signal.

The color structure may be formed on a back surface of the button structure.

The sensor module may be provided such that a light emitting surface of the light emitter and a light receiving surface of the color sensor are arranged to face the color structure.

The color structure may include a plurality of color zones.

The button structure may move in a plurality of directions including left and right directions with respect to a front surface of the display apparatus.

The controller may generate at least one control signal among a control signal for correcting the display screen and a control signal for controlling display of the display screen based on the sensor value information of the sensor module.

The color sensor may collect external light through the hole, and the controller may generate the control signal for correcting the display screen based on the sensor value information of the sensor module generated by the external light.

The controller may switch an operation mode of the input device to a button mode when the ambient illuminance is determined to be equal to or less than a predetermined illuminance value based on the sensor value information of the sensor module.

The switching the operation mode of the input device to the button mode may include controlling the light emitter to operate.

The controller may determine a moving direction of the button structure based on the sensor value information of the sensor module and generate the control signal for controlling the display screen display when the button structure is moved according to a user's operation.

The color structure may move together with the button structure when the button structure is moved according to a user's operation, and the light emitter may provide such that light generated in the light emitter is reflected by the color structure and is incident on the color sensor.

In accordance with another aspect of the present disclosure, a method for controlling a display apparatus having an input device is provided. According to an aspect of the present disclosure, the input device includes: a housing; a spring inside the housing, a button structure configured to be elastically supported by the spring to be movable, the button structure being formed with a hole and a color structure around the hole. and a sensor assembly disposed to be spaced apart from the button structure inside the housing, the sensor assembly including a light emitter configured to provide light and a color sensor configured to collect ambient light. According to an aspect of the present disclosure, the method includes: generating at least one control signal to correct a display and controlling the display based on the at least one control signal generated and sensor value information of the sensor assembly, respectively, and providing the display screen based on the generated control signal.

The color sensor may collect external light through the hole, and the generating of the control signal to correct the display based on the sensor value information of the sensor assembly may include generating the at least one control signal to correct the display screen based on the sensor value information of the color sensor generated by the external light.

The method may further include: switching an operation mode of the input device to a button mode when illuminance of the ambient light is determined to be equal to or less than a predetermined illuminance value based on the sensor value information of the sensor assembly.

The switching of the operation mode of the input device to the button mode may include controlling the light emitter to operate.

The button structure may move in a plurality of directions including left and right directions with respect to a front surface of the display apparatus, and the generating of the control signal to control the display based on the sensor value information of the sensor assembly may include determining a moving direction of the button structure based on the sensor value information of the sensor assembly and generating the control signal to control the display screen display when the button structure is moved according to a user's operation.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 14 is a flowchart illustrating a method for controlling the display apparatus according to an embodiment.

DETAILED DESCRIPTION

Figure 1:
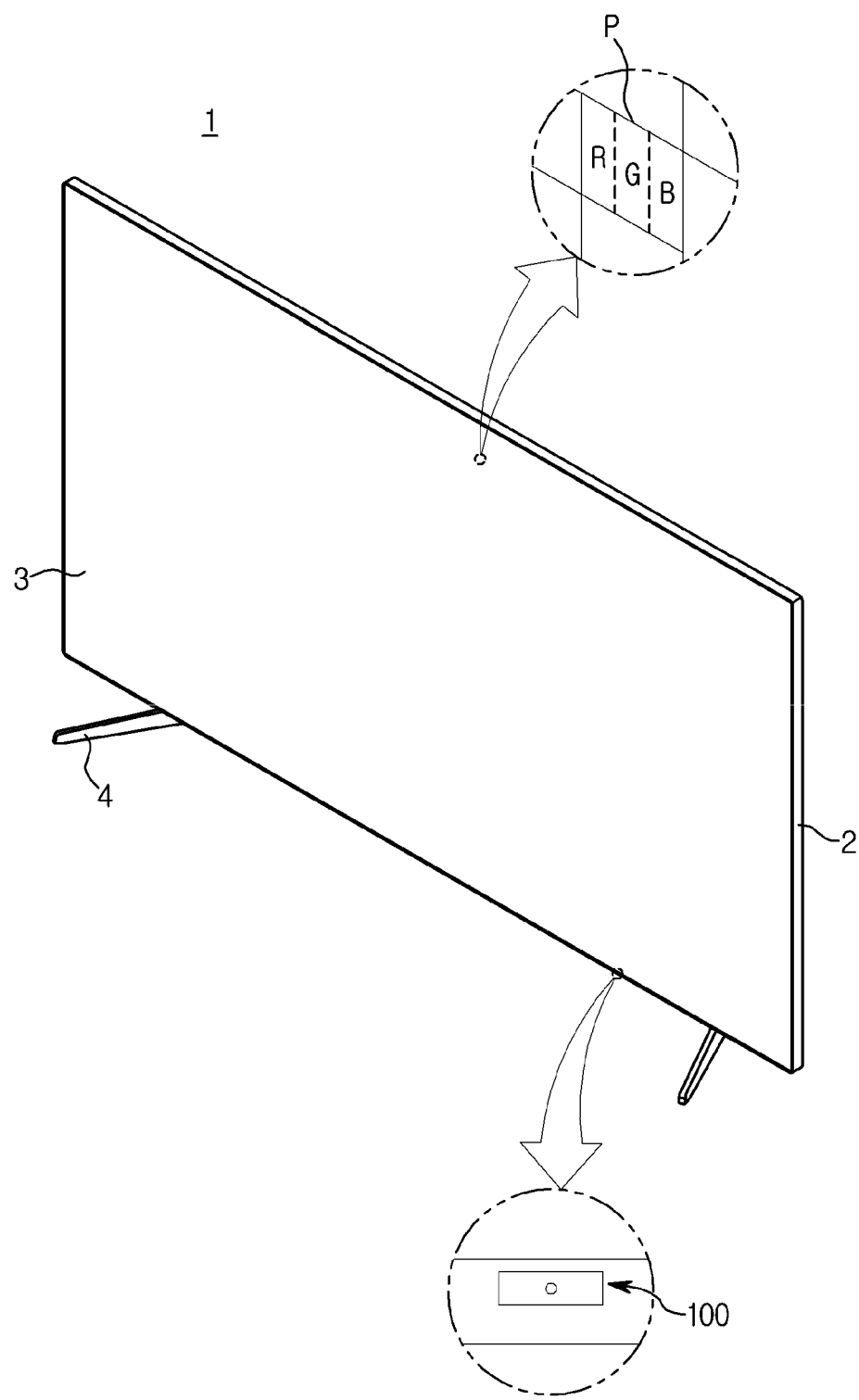
FIG. 1 is a view illustrating a display apparatus according to an embodiment.

Like numerals refer to like elements throughout the specification. Not all elements of the embodiments of the present disclosure will be described, and the description of what are commonly known in the art or what overlaps each other in the embodiments will be omitted. The terms as used throughout the specification, such as "~part," "~module," "~member," "~block,", "~assembly", etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section without limitation.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operating principle and embodiments of the present disclosure will be described with reference to the accompanying drawings.

FIG. 1 is a view illustrating a display apparatus according to an embodiment.

A display apparatus 1 is an apparatus capable of processing an image signal received from the outside and visually displaying the processed image. Hereinafter, the case in which the display apparatus 1 is a television (TV) is described as an example, but the type of the display apparatus 1 is not limited thereto. For example, the display apparatus 1 may be implemented in various forms such as a monitor, a portable multimedia device, a portable communication device, a portable computing device, and there is no limitation in the shape of the display apparatus 1 as long as the display apparatus 1 is capable of visually displaying an image.

In addition, the display apparatus 1 may be a large format display (LFD) installed outdoors such as a building roof or a bus stop. The outdoors is not necessarily limited to the outside, but should be understood as a concept including a place where a large number of people can go in and out even a room such as a subway station, a shopping mall, a movie theater, a company, a store, etc.

The display apparatus 1 may receive a video signal and an audio signal from various content sources, and may output a video and an audio corresponding to the video signal and the audio signal. For example, the display apparatus 1 may receive television broadcast content through a broadcast receiving antenna or a cable, receive content from a content reproduction device, or receive the content from a content providing server of a content provider.

The display apparatus 1 may include a main body 2, a screen 3 configured to display the image, a support 4 provided at a lower part of the main body 2 and configured to support the main body 2, and an input device 100 provided in the main body 2 and configured to operate the display apparatus 1.

The main body 2 may form an appearance of the display apparatus 1 and a component for displaying the image by the display apparatus 1 may be provided in the inside of the main body 2. The body shown in FIG. 1 may be in the form of a flat plate, but the shape of the main body 2 is not limited to that shown in FIG. 1. For example, the main body 2 may have a shape in which the left and right ends protrude forward and the center part is curved so as to be concave.

The screen 3 may be formed on the front surface of the main body 2, and the screen 3 may display the image as visual information. For example, a still image or a moving image may be displayed on the screen 3, and a two-dimensional plane image or a three-dimensional stereoscopic image may be displayed.

A plurality of pixels may be formed on the screen 3, and the image displayed on the screen 3 may be formed by a combination of light emitted from the plurality of pixels. For example, a single image I may be formed on the screen 3 by combining the light emitted by the plurality of pixels P with a mosaic.

Each of the plurality of pixels P may emit the light of various brightness and various colors. Each of the plurality of pixels may include a configuration (for example, an organic light emitting diode) capable of emitting the light directly in order to emit the light of various brightness, or a configuration (for example, a liquid crystal panel) capable of transmitting or blocking the light emitted by a backlight unit or the like.

The screen 3 may be provided in a flat plate shape as shown in FIG. 1. However, the shape of the screen 3 is not limited to that shown in FIG. 1. It may be provided in a shape in which both ends protrude forward and the center portion is curved so as to be concave according to the shape of the main body 2.

The support 4 may be provided at the lower part of the main body 2 so that the main body 2 can stably maintain its position on the floor. Alternatively, the support 4 may be provided on the rear surface of the main body 2 so that the main body 2 is firmly fixed to the wall surface.

The input device 100 may be provided in one area of the main body 2, and configured to control power on/off of the display apparatus 1 or receive various operation commands for the display apparatus 1. The input device 100 may be provided in one area of the lower surface of the main body 2 as shown in FIG. 1. However, the installation position of the input device 100 is not limited thereto and may be provided in one side of the bezel on the front surface of the main body 2 or on both sides of the main body 2 or on the rear surface of the main body 2 according to the embodiment.

The input device 100 may be a multi-channel input device using a color sensor. The color sensor provided in the display apparatus 1 may perform the original function of the color sensor and may be also applied as a main component of the input device 100. In other words, the function of the color sensor may be performed in the display apparatus 1, and the corresponding color sensor may be applied as the main component of the input device 100, thereby providing a simplified structure of the button of the display apparatus 1. The main structure and operation principle of the input device 100 will be described in detail in the related section.

Figure 2:
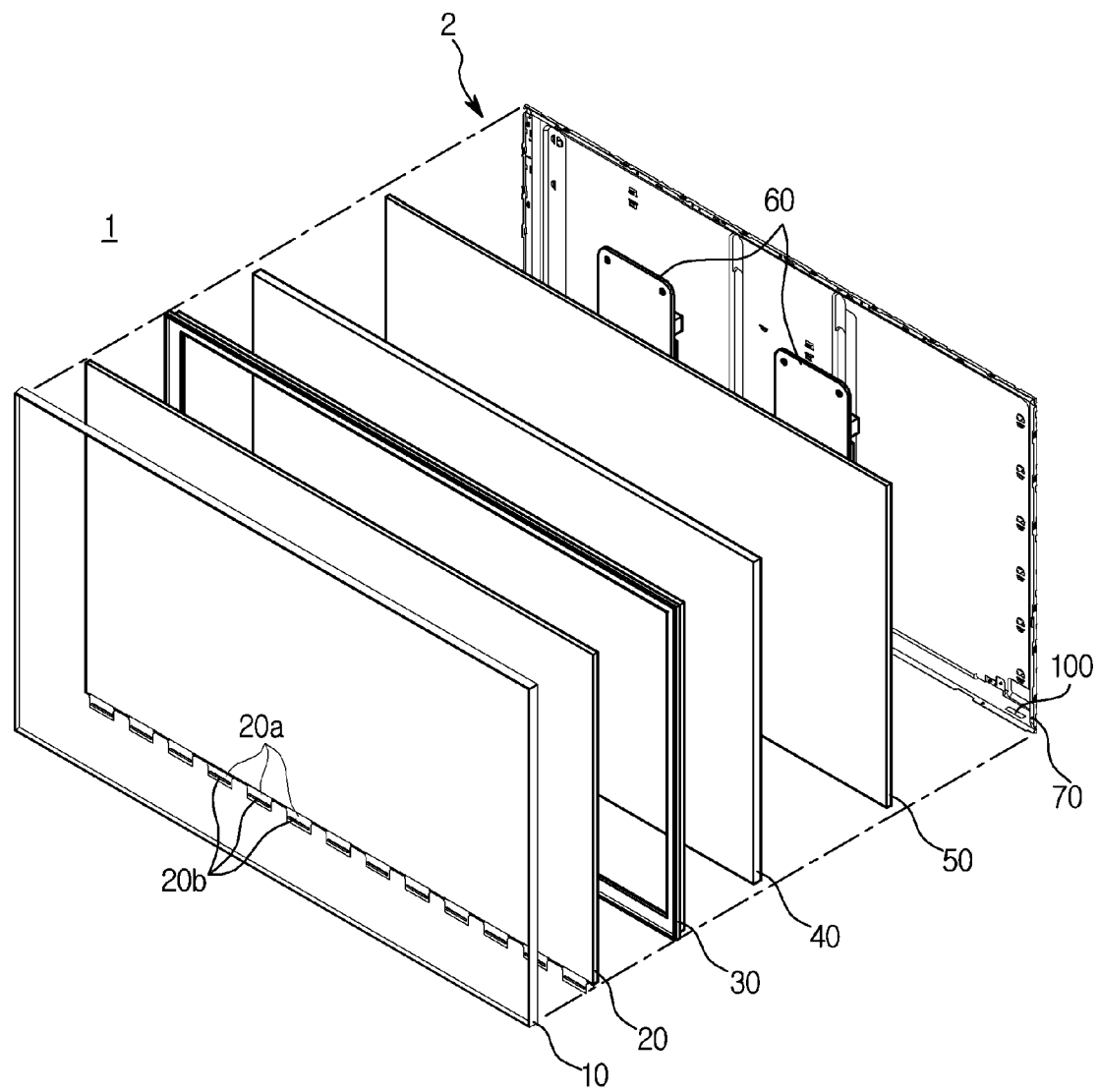
FIG. 2 is an exploded perspective view illustrating the display apparatus according to an embodiment.

FIG. 2 is an exploded perspective view illustrating the display apparatus according to an embodiment.

As shown in FIG. 2, various components for generating the image on the screen 3 may be provided in the main body 2.

For example, the main body 2 may include a backlight unit 40 configured to emit a surface light forward, a liquid crystal panel 20 configured to block or transmit the light emitted from the backlight unit 40, and a power supply/controller 60 configured to control operations of the backlight unit 40 and the liquid crystal panel 20.

The main body 2 may further include a bezel 10, a frame middle mold 30, a bottom chassis 50, and a rear cover 70 for supporting and fixing the liquid crystal panel 20, the backlight unit 40 and the power supply/controller 60.

Also, at least one of the bezel 10, the frame middle mold 30, and the rear cover 70 may have a hole for installing the input device 100, and the input device 100 may be embedded in the corresponding hole. The input device 100 may be formed integrally with at least one of the bezel 10, the frame middle mold 30, and the rear cover 70 according to the embodiment.

The backlight unit 40 may include a point light source for emitting monochromatic light or white light and may refract, reflect, and scatter the light to convert the light emitted from the point light source into a uniform surface light. For example, the backlight unit 40 may include a light source for emitting the monochromatic light or white light, a light guide plate for diffusing the light incident from the light source, a reflective sheet for reflecting the light emitted from the rear surface of the light guide plate, and an optical sheet for refracting and scattering the light emitted from the front surface of the light guide plate.

As such, the backlight unit 40 may emit a uniform surface light toward the front by refracting, reflecting, and scattering the light emitted from the light source.

The liquid crystal panel 20 may be provided in front of the backlight unit 40 and configured to block or transmit the light emitted from the backlight unit 40 in order to form the image.

The front surface of the liquid crystal panel 20 may form the screen 3 of the display apparatus 1 described above and may be composed of the plurality of pixels P. The plurality of pixels P included in the liquid crystal panel 20 may independently block or transmit the light of the backlight unit 40. The light transmitted by the plurality of pixels P may form the image to be displayed on the display apparatus 1.

Figure 3:
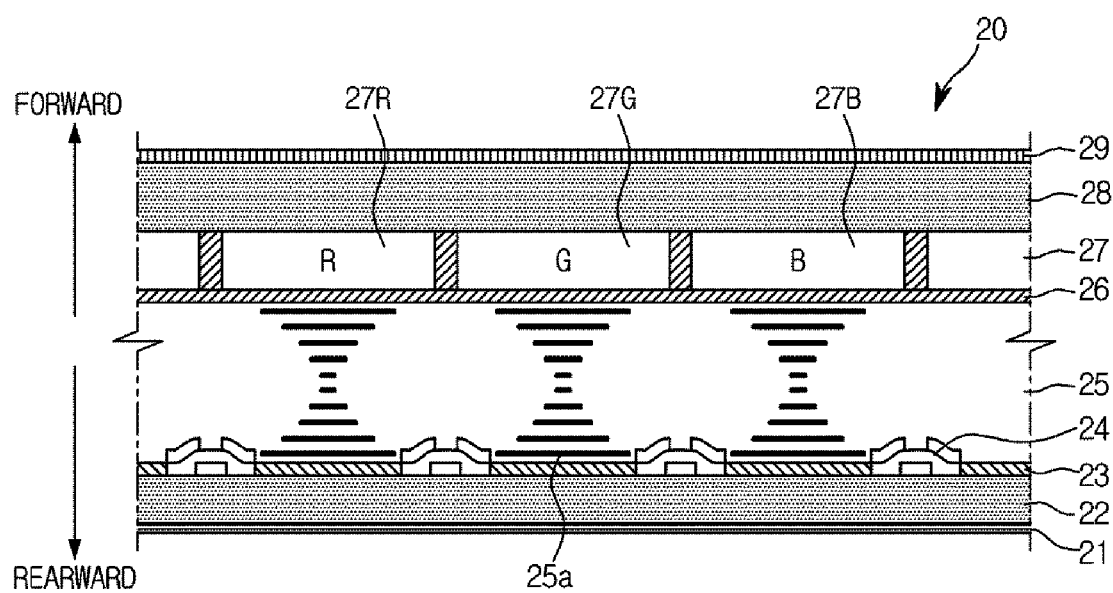
FIG. 3 is a view illustrating an example of a liquid crystal panel which is included in the display apparatus according to an embodiment.

FIG. 3 is a view illustrating an example of a liquid crystal panel which is included in the display apparatus according to an embodiment.

Referring to FIG. 3, the liquid crystal panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may support the pixel electrode 23, the thin film transistor 24, the liquid crystal layer 25, the common electrode 26, and the color filter 27 in a fixed manner. The first and second transparent substrates 22 and 28 may be composed of tempered glass or transparent resin.

The first polarizing film 21 and the second polarizing film 29 may be provided on the outer sides of the first and second transparent substrates 22 and 28. The first polarizing film 21 and the second polarizing film 29 may transmit a specific light and block a different light, respectively.

The light may be a pair of an electric field and a magnetic field that oscillate in a direction perpendicular to the traveling direction. The electric field and the magnetic field constituting the light may oscillate in all directions perpendicular to the traveling direction of light, and the oscillation direction of the electric field and the oscillation direction of the magnetic field may be perpendicular to each other.

For example, the first polarizing film 21 may transmit the light having the magnetic field oscillating in a first direction and block other light. Further, the second polarizing film 29 may transmit the light having the magnetic field oscillating in a second direction and block other light. At this time, the first direction and the second direction may be perpendicular to each other. In other words, the polarizing direction of the light transmitted by the first polarizing film 21 and the oscillating direction of the light transmitted by the second polarizing film 29 may be perpendicular to each other. As a result, the light may not pass through the first polarizing film 21 and the second polarizing film 29 at the same time.

The color filter 27 may be provided in the inside of the second transparent substrate 28. The color filter 27 may include a red filter 27R for transmitting a red light, a green filter 27G for transmitting a green light, and a blue filter 27B for transmitting a blue light. The red filter 27R, the green filter 27G, and the blue filter 27B may be arranged side by side. In addition, the corresponding region in which the color filter 27 is formed may correspond to the pixel P described above.

The thin film transistor (TFT) 24 may be provided in the inside of the first transparent substrate 22. For example, the thin film transistor 24 may be provided at a position corresponding to the boundary between the red filter 27R, the green filter 27G, and the blue filter 27B.

The thin film transistor 24 may transmit or block the current flowing to the pixel electrode 23 described below. For example, the electric field may be formed or removed between the pixel electrode 23 and the common electrode 26 according to the turning on (closing) or turning off (opening) of the thin film transistor 24.

The thin film transistor 24 may be formed of polysilicon or may be formed by semiconductor process such as lithography, deposition, or ion implantation.

The pixel electrode 23 may be provided in the inside of the first transparent substrate 22 and the common electrode 26 may be provided in the inside of the second transparent electrode 28.

The pixel electrode 23 and the common electrode 26 may be composed of a conductive metal which electricity is conducted and may generate the electric field for changing the arrangement of a liquid crystal molecules 25a constituting the liquid crystal layer 25 to be described below.

The pixel electrode 23 may be formed in a region corresponding to the red filter 27R, the green filter 27G and the blue filter 27B, and the common electrode 26 may be formed on the entire liquid crystal panel 20. As a result, the electric field may be selectively formed in the liquid crystal layer 25 according to the position of the pixel electrode 23.

The pixel electrode 23 and the common electrode 26 are composed of a transparent material and may transmit the light incident from the outside. For example, the pixel electrode 23 and the common electrode 26 may be composed of indium tin oxide (ITO), indium zinc oxide (IZO), silver nano wire, carbon ano tube (CNT), graphene, or PEDOT (3,4-ethylenedioxythiophene).

The liquid crystal layer 25 may be formed between the pixel electrode 23 and the common electrode 26, and the liquid crystal layer 25 may be filled with the liquid crystal molecules 25a.

The liquid crystal may represent an intermediate state between a solid (crystal) and a liquid. In general, when a solid material is heated, the state may change from a solid state to a transparent liquid state at a melting temperature. On the other hand, when the heat is applied to a liquid crystal material in the solid state, the liquid crystal material may change to the transparent liquid state after being changed into an opaque and turbid liquid at the melting temperature. Most of these liquid crystal materials are organic compounds, and their molecular shapes have a long and narrow rod shape. The arrangement of the molecules is the same as an irregular state in any direction, but may have a regular crystal form in other direction. As a result, the liquid crystal has both fluidity of liquid and the optical anisotropy of crystal (solid).

The liquid crystal may also exhibit optical properties according to the change of the electric field. For example, the direction of the molecular arrangement of the liquid crystal may change according to the change of the electric field.

When the electric field is generated in the liquid crystal layer, the liquid crystal molecules 25a of the liquid crystal layer 25 may be arranged in the direction of the electric field. When no the electric field is generated in the liquid crystal layer 25, the liquid crystal molecules 25a may be irregularly arranged or disposed along an alignment film (not shown).

As a result, the optical properties of the liquid crystal layer 25 may change according to the presence or absence of the electric field passing through the liquid crystal layer 25. For example, when the electric field is not formed in the liquid crystal layer 25, the light polarized by the first polarizing film 21 may pass through the second polarizing film 119 after passing through the liquid crystal layer 25 due to the arrangement of the liquid crystal molecules 25a of the liquid crystal layer 25. On the other hand, when the electric field is formed in the liquid crystal layer 25, the arrangement of the liquid crystal molecules 25a of the liquid crystal layer 25 changes so that the light polarized by the first polarizing film 21 may not pass through the second polarizing film 29 after passing through the liquid crystal layer 25.

The power supply/controller 60 may include a power supply circuit for supplying a voltage to the backlight unit 40 and the liquid crystal panel 20 and a control circuit for controlling operations of the backlight unit 40 and the liquid crystal panel 20.

The power supply circuit may supply electric power to the backlight unit 40 so that the backlight unit 40 can emit the surface light and supply the electric power to the liquid crystal panel 20 so that the liquid crystal panel 20 can transmit or block the light.

The control circuit may control the backlight unit 40 to control the intensity of the light emitted by the backlight unit 40 and may control the liquid crystal panel 20 to display the image on the screen 3.

For example, the control circuit may control the liquid crystal panel 20 to display the image based on the video signal received from the content sources. Each of the plurality of pixels P included in the liquid crystal panel 20 may transmit or block the light according to an image data of the control circuit, so that the image is displayed on the screen 3.

The power supply/controller 60 may be implemented as a printed circuit board and various circuits mounted on the printed circuit board. For example, the power supply circuit may include a capacitor, a coil, a resistance element, a microprocessor, and the like, and a power supply circuit board on which the power supply circuit is mounted. Further, the control circuit may include a memory, a microprocessor, and a control circuit board on which the control circuit is mounted.

Between the liquid crystal panel 20 and the power supply/controller 60, a cable 20a for transferring the image data from the power supply/controller 60 to the liquid crystal panel 20 and a display driver integrated circuit (DDI) 20b (hereinafter, referred to as 'display drive unit') for processing the image data may be provided.

The cable 20a may electrically connect the power supply/controller 60 and the display drive unit 20b and electrically connect the display drive unit 20b and the liquid crystal panel 20 to each other.

The display drive unit 20b may receive the image data from the power supply/controller 60 through the cable 20a and transmit the image data to the liquid crystal panel 20 through the cable 20a.

The input device 100 may be provided to receive a control command for controlling the display apparatus 1 from a user.

The input device 100 may operate in the color sensor mode while a user's operation command is not input. Hereinafter, the color sensor mode may refer to a mode of collecting external light information with the color sensor provided in the input device 100 and correcting a display screen based on the collected external light information.

The input device 100 may operate in the button mode while the user's operation command is input. Hereinafter, the button mode may refer to a mode in which the input device 100 receives the user's operation command in a predetermined direction.

The display apparatus 1 according to the present disclosure may be provided with a single input device in the display apparatus 1 and the color sensor applied to the input device may be used not only for collecting illuminance information necessary for screen correction of the display apparatus 1, but also as one of button structures for manipulating the display screen so as to provide a simplified structure of the button of the display apparatus 1.

Hereinafter, the structure of the input device 100 installed in one area of the display apparatus 1 according to the disclosure will be described in detail.

Figure 4:
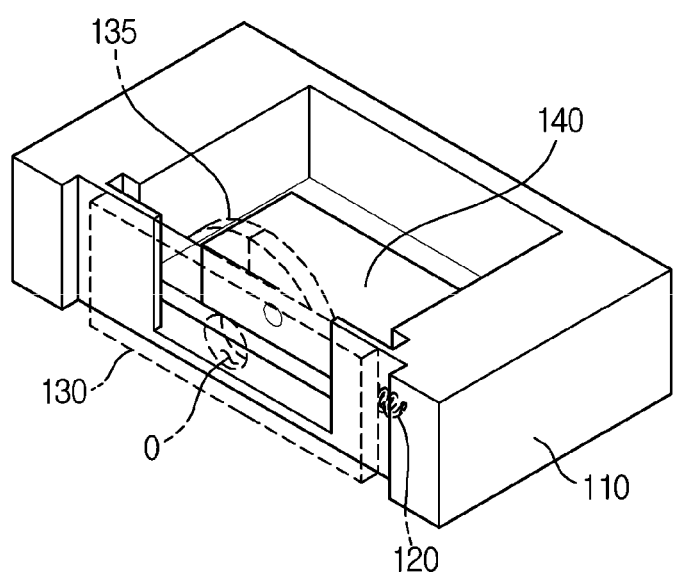
FIGS. 4 and 5 are enlarged views illustrating of a structure of an input device according to an embodiment.
Figure 5:
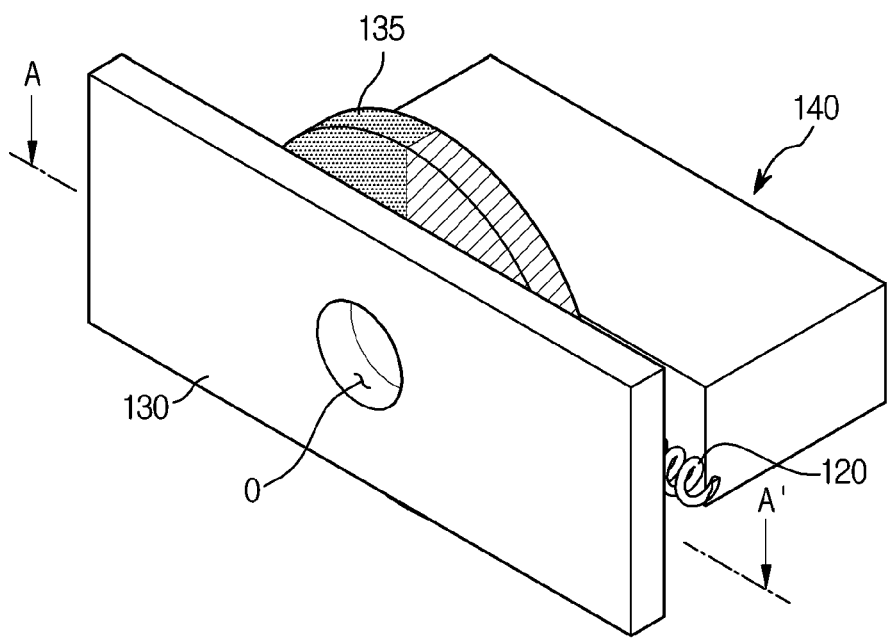
Figure 6:
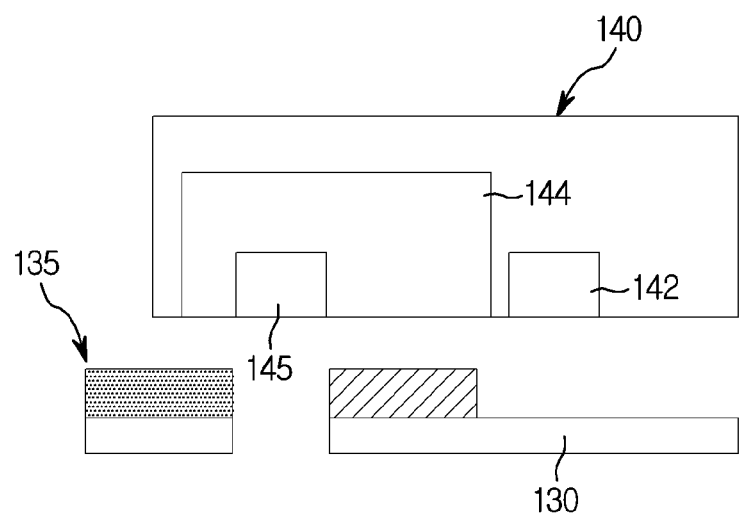
FIG. 6 is a cross-sectional view of the input device shown in FIG. 5, which is taken along AA' direction.

FIGS. 4 and 5 are views for explaining the structure of the input device 100 installed in the display apparatus 1, and FIG. 6 is a cross-sectional view of the input device 100 shown in FIG. 5, which is taken along AA' direction.

Referring to FIGS. 4 to 6, the input device 100 according to the embodiment may be embedded in one area of the display apparatus 1 and may include a housing 110, a spring 120 installed on the inner wall of the housing 110, a button structure (button) 130 elastically supported by the spring 110 to be movable in the predetermined direction, and a sensor module (assembly) 140 installed in the housing 110 so as to be spaced apart from the button structure 130.

The housing 110 may form the appearance of the input device 100. An opening may be formed on the front surface of the housing 110 so as to assemble the button structure 130. The housing 110 may be provided with a fastening structure on its outer surface so as to be embedded in the hole O formed in one area of the display apparatus 1.

In the housing 110, a component for receiving the user's operation command by the input device 100 and transmitting the input operation command to a controller 170 of the display apparatus 1 may be provided. FIGS. 4 and 5 illustrate the case where the housing 110 is provided in a box shape having an opening in a rectangular shape, the shape of the housing 110 is not limited to the shapes shown in FIGS. 4 and 5.

The spring 120 may be installed on the inner wall of the housing 110. The spring 120 may be installed on the inner wall of the front opening of the housing 110. The spring 120 may operate in conjunction with the button structure 130 described below to form the input channel of the input device 100. In other words, as the number of the springs 120 increases, the number of channels of the input device 100 that can be operated may be increased.

Figure 7:
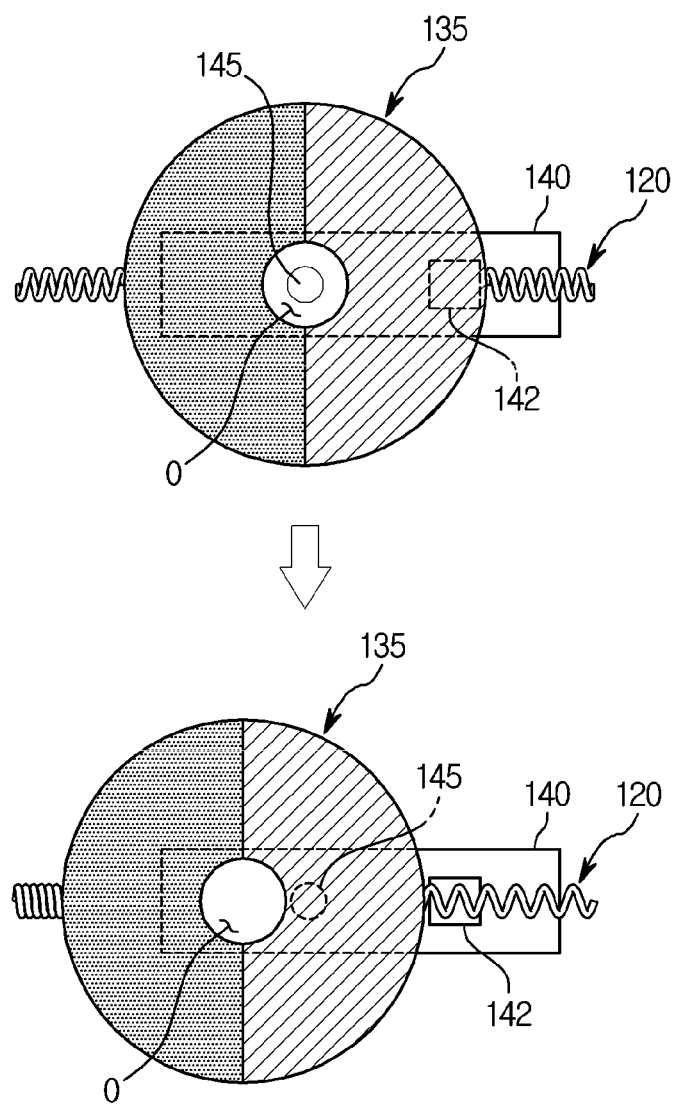
FIGS. 7 and 8 are views illustrating examples of formation of a multi-channel input device.
Figure 8:
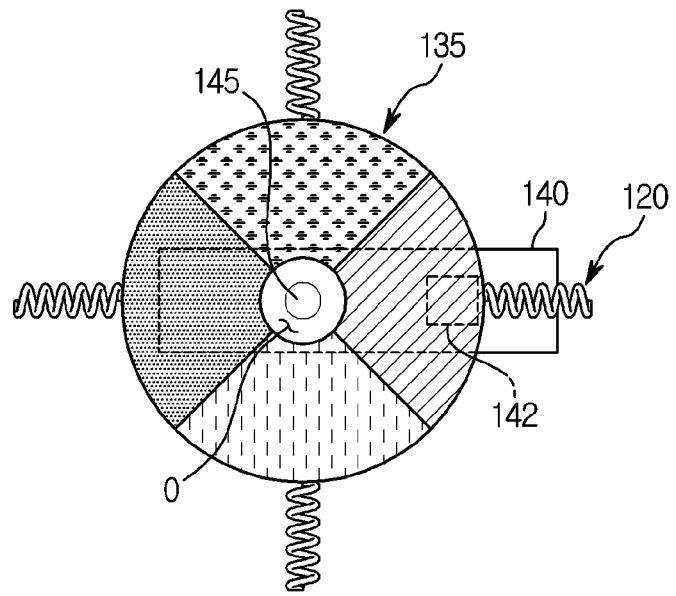
Figure 8:
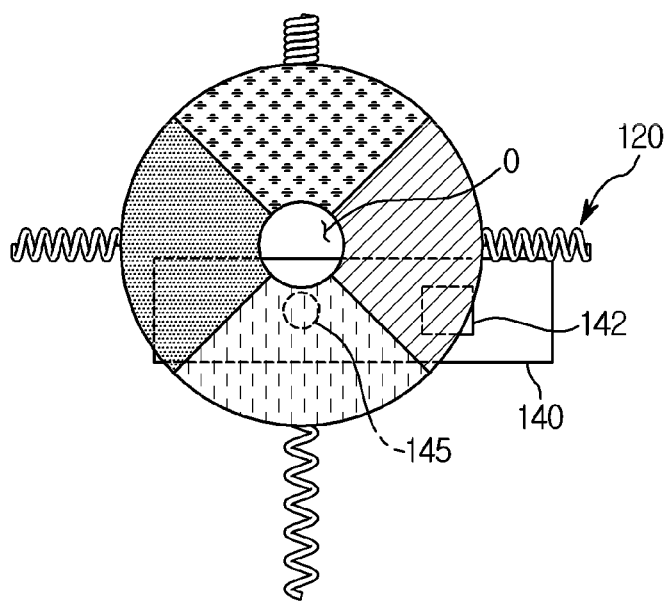

FIGS. 7 and 8 are views illustrating examples of formation of a multi-channel input device 100. More particularly, FIG. 7 is view illustrating the structure of the input device 100 forming two input channels, and FIG. 8 is view illustrating the structure of the input device 100 forming four input channels. Referring to FIGS. 7 and 8 illustrate an example of forming the input channel around the fastening structure of the spring 120 and a color structure 135 for convenience of description.

Referring to FIG. 7, when the spring 120 is installed on the left and right inner walls of the inner wall of the housing 110, the two input channels may be formed. The user may input the operation command by sliding the button structure 130 of the input device 100 in the left and right directions.

Referring to FIG. 8, the four input channels may be formed when the spring 120 is installed on the upper, lower, right, and left inner walls of the inner wall of the housing 110. The user may input the operation command by sliding the button structure 130 of the input device 100 in the up, down, left, and right directions.

Referring to FIGS. 7 and 8 illustrate the case where two or four input channels are formed for convenience of description. However, the method of forming the input channels is not limited to that shown in FIGS. 7 and 8, but may be provided with four or more channels according to the shape of the housing 110.

The button structure 130 may be a structure provided to receive the user's operation command, and may be structured to be elastically supported by the spring 120 and movable in the predetermined direction. More particularly, the button structure 130 may be movable in a plurality of directions including the left and right directions with respect to the front surface of the display apparatus 1.

The button structure 130 may be formed with the hole O passing through the button structure 130 at the center of the button structure 130. The button structure 130 may be provided so that the center axis of the hole O formed in the button structure 130 coincides with the central axis of a light receiver 145 of a color sensor 144 described later. The input device 100 may operate in the color sensor mode when the hole O of the button structure 130 is opened and the input device 100 may operate in the button mode when the hole O of the button structure 130 is closed by the user's hand. Hereinafter, the operation principle of the input device 100 will be described in detail.

A groove may be formed on the operation surface of the button structure 130 for the user's convenience. In this case, the hole O may be formed in the groove region. The operation mode of the input device 100 is switched to the color sensor mode or the button mode depending on whether the hole O is open or not so as to provide the user with operational convenience.

The color structure 135 may be provided around the hole O on the back surface of the button structure 130. The color structure 135 may be provided movably together with the button structure 130. In the example, the color structure 135 may be integrally provided with the button structure 130, and may be provided in such a manner that the color structure 135 formed independently of the button structure 130 according to the embodiment is coupled to the button structure 130. Hereinafter, the embodiment of the present disclosure will be described on the assumption that a separate color structure 135 is provided in a manner coupled to the button structure 130 for convenience of description.

The color structure 135 may be provided in a circular plate shape partitioned into a plurality of color zones. The number of color zones that are partitioned in the color structure 135 may be determined based on the number of input channels to be implemented through the input device 100.

Figure 9A:
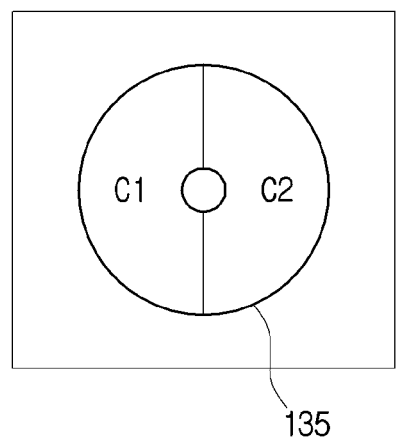
FIGS. 9A and 9B are views illustrating an example of respective sections of color zones with respect to a color structure.
Figure 9B:
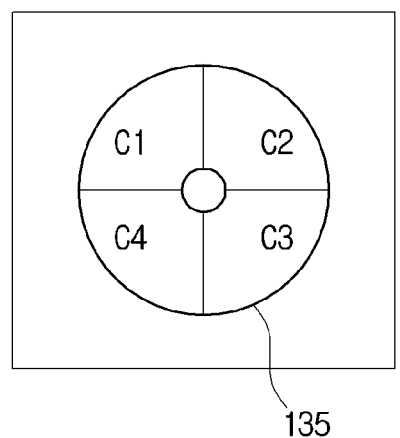

FIGS. 9A and 9B are views illustrating an example of a section of color zones with respect to the color structure 135.

Referring to FIGS. 9A and 9B, the color structure 135 may be partitioned into a plurality of color zones. For example, when the two input channels are to be formed in the input device 100 as shown in FIG. 9A, the color structure 135 may be partitioned two color zones C1 and C2 as shown in FIG. 9A. According to the embodiment, when the four input channels are to be formed in the input device 100, the color structure 135 may be partitioned into four color zones C1, C2, C3, and C4 as shown in FIG. 9B.

The color structure 135 may be configured to reflect the light generated by a light emitter 142 of the sensor module 140 to be described later to the light receiver 145 of the color sensor 144. The example of the partition of the color zones is not limited by what is shown in FIGS. 9A and 9B, and the position and the number of the color zones partitioned in the color structure 135 may be adjusted according to the number of channels of the input device 100 to be implemented.

The color structure 135 may be provided in the circular plate shape as shown in FIGS. 9A and 9B. When the color structures 135 are provided in the circular plate shape, it is easy to form a multi-channel structure. However, the shape of the color structure 135 is not limited to the circular plate shape, and the partition of the color zones may be provided in all possible shapes.

The color structure 135 may have the hole O having the same center axis as the hole O formed in the button structure 130 described above. The color structure 135 may be formed such that the hole O having the same center axis as the hole O formed in the button structure 130 passes through the color structure 135 so as to supply the external light to the sensor module 140 installed inside the housing 110. The reason why the hole O is formed in the color structure 135 is the same as the reason for forming the hole O in the button structure 130 and the overlapping contents of the above description will be omitted.

The sensor module 140 may be installed inside the housing 110 and spaced apart from the button structure 130 by a predetermined distance. The sensor module 140 may include the light emitter 142 provided to supply the light and the color sensor 144 arranged to collect an ambient light. The ambient light may refer to the external light that is introduced from the outside through the hole O and the light generated by the light emitter 142 when the hole O is closed.

The sensor module 140 may be formed so that the light emitting surface of the light emitter 142 and the light receiving surface of the light receiver 145 provided in the color sensor 144 are opposed to the color structure 135. In other words, the light emitter 142 and the color sensor 144 may be arranged side by side on one side of the sensor module 140. This is because the light generated by the light emitter 142 may be reflected to the color structure 135 and then reach the light receiver 145 of the color sensor 144 when the input device 100 operates in the button mode. When the input device 100 operates in the button mode, the button structure 130 may be movable in the predetermined direction. When the input device 100 operates in the button mode, the sensor module 140 may detect the light reflected from the color structure 135 moving with the movement of the button structure 130 and provide it to the user operation intention detection process of the display apparatus 1. Hereinafter, the related part will be described in detail.

The light receiver 145 of the color sensor 144 and the holes O formed in the button structure 130 may be formed to face each other when the button structure 130 is in the neutral state. This is because when the input device 100 operates in the color sensor mode, the external light that has flowed into the housing 110 of the input device 100 through the hole O directly reaches the light receiver 145 of the color sensor 144.

The structures of the display apparatus 1 and the input device 100 provided in the display apparatus 1 have been described above. Next, the operation principle of the display apparatus 1 according to the disclosure with reference to the accompanying drawings will be described.

Figure 10:
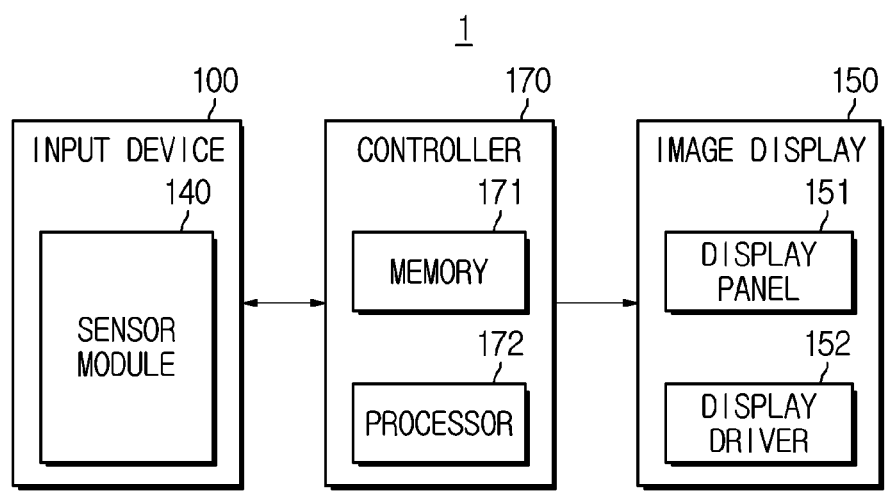
FIG. 10 is a control block diagram illustrating the display apparatus according to an embodiment.

FIG. 10 is a control block diagram illustrating the display apparatus 1 according to an embodiment.

Referring to FIG. 10, the display apparatus 1 may include the input device 100, the controller 170 configured to process sensor value signals generated by the sensor module 140 of the input device 100 and to control the operation of the display apparatus 1, and an image display 150 configured to display the processed image.

The input device 100 may be provided so as to be operable in the color sensor mode and the button mode. When the button structure 130 is in the neutral state, the input device 100 may operate in the color sensor mode. Also, when the user operates the button structure 130, the input device 100 may operate in the button mode.

The input device 100 may include the sensor module 140 and the sensor module 140 may include the light emitter 142 for generating the light and the color sensor 144 for collecting the ambient light.

The light emitter 142 is a configuration for supplying light to the inside of the input device 100 in the button mode. In the button mode, the external light flowing through the hole O may block, and the illuminance inside the input device 100 may approach zero. In this case, the light emitter 142 may supply light into the input device 100 so that the input device 100 operates in the button mode.

The color sensor 144 is configured to collect the ambient light and the input device 100 may be operable in the two modes illustrated above by applying the color sensor 144. For example, in the color sensor mode, the color sensor 144 may collect external light information that has been flowed through the hole O and provide it to the process of correcting the screen of the display apparatus 1. As another example, in the button mode, the color sensor 144 may collect color light reflected from the color structure 135 and provide it to the user operation determination process of the display apparatus 1.

The image display 150 may include a display panel 151 for visually displaying an image and a display driver 152 for driving the display panel 151.

The display panel 151 may generate the image according to the image data received from the display driver 152, and display the image.

The display panel 151 may include a pixel serving as a unit for displaying the image. Each pixel may receive an electrical signal representative of the image from the display driver 152 and output an optical signal corresponding to the received electrical signal. As described above, the optical signals output by the plurality of pixels may be combined and displayed on the display panel 151.

The display panel 151 may be implemented with the liquid crystal panel 20 (see FIGS. 2 and 3) described with reference to FIGS. 2 and 3. However, the embodiment of the display panel 151 is not limited to the liquid crystal panel, but may be implemented by an organic light emitting diode panel or the like.

The display driver 151 may receive the image data from the controller 170 and may drive the display panel 151 to display the image corresponding to the received image data. Particularly, the display driver 152 may transmit the electrical signal corresponding to the image data to each of the plurality of pixels constituting the display panel 151.

When the display driver 152 transmits the electrical signal corresponding to the image data to each pixel constituting the display panel 151, each pixel may output the light corresponding to the received electrical signal, and the light output by each pixel may be combined to form a single image.

The display driver 152 may be implemented with the display drive integrated circuit 20b (see FIG. 2) described in conjunction with FIG. 2.

The controller 170 may include a memory 171 and a processor 172.

The memory 171 may store programs and data for controlling the display apparatus 1 and temporarily store the data generated while the display apparatus 1 is being controlled.

In addition, the memory 171 may store the programs and data for processing video signals and/or audio signals, and temporarily store the data generated during processing of the video signals and/or audio signals.

The memory 171 may store the programs and data for processing the sensor values generated by the sensor module 140 of the input device 100 and temporarily store the data generated during processing of the sensor values.

The memory 171 may include a non-volatile memory such as a ROM or a flash memory for storing the data for a long time, a volatile memory such as a static random access memory (S-RAM) or a dynamic random access memory (D-RAM) for temporarily storing the data.

The processor 172 may receive the sensor value from the sensor module 140 of the input device 100, and may generate at least one of the control signal for correcting the display screen based on the received sensor value information and the control signal for controlling the display of the display screen.

The processor 172 may operate the input device 100 in the color sensor mode when it is determined that the ambient illuminance exceeds a predetermined illuminance value based on the sensor value information of the sensor module 140. Also, the processor 172 may switch the operation mode of the input device 100 to the button mode by controlling the operation of the light emitter 142 when it is determined that the ambient illuminance is equal to or less than the predetermined illuminance value.

More particularly, when the user is not operating the input device 100, the external light may be supplied to the color sensor 144 through the hole O of the button structure 130, and the processor 172 may control the input device 100 to operate in the color sensor mode. Conversely, when the user inputs the operation command to the input device 100, the external light supplied to the color sensor 144 through the hole O of the button structure 130 may be blocked by the user's hand, the processor 172 may switch the operation mode of the input device 100 to the button mode.

Hereinafter, the operation principle of the color sensor mode and the button mode will be described in more detail with reference to the accompanying drawings.

Figure 11:
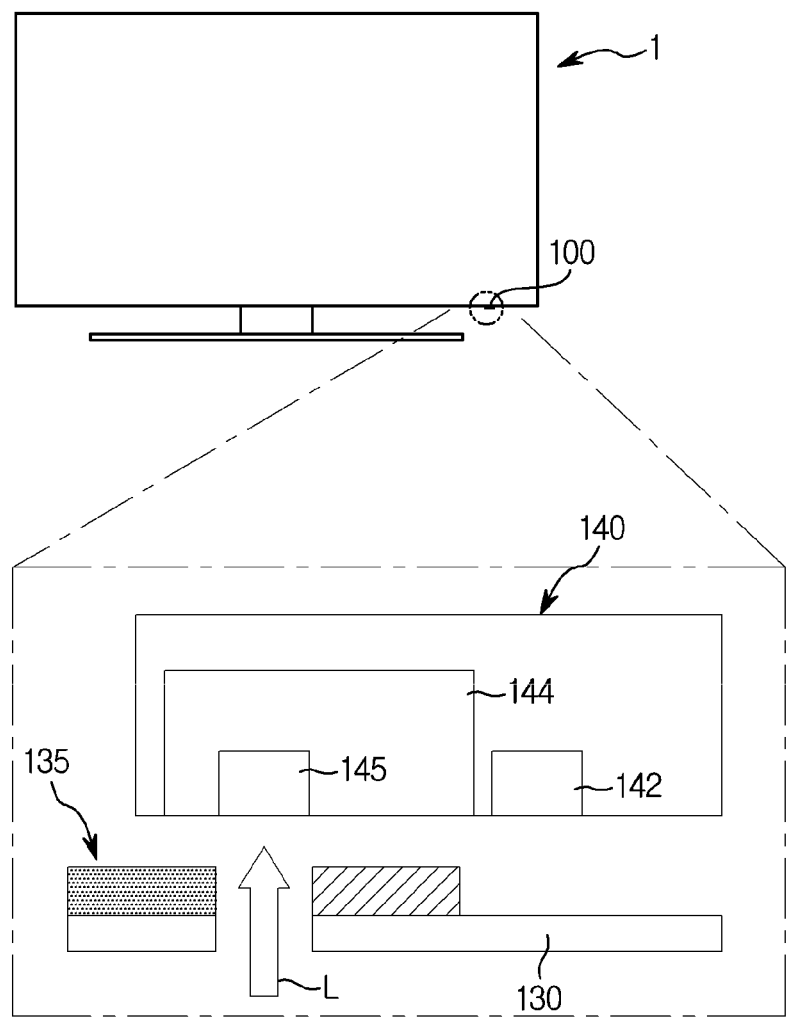
FIG. 11 is a view illustrating a case where the input device according to an embodiment operates in a color sensor mode.

FIG. 11 is a view illustrating a case where the input device 100 according to an embodiment operates in color sensor mode.

The color sensor mode may refer to a mode of collecting the external light information with the color sensor 144 provided in the input device 100 and correcting the display screen based on the collected external light information. As shown in FIG. 11, when the button structure 130 is in the neutral state, the input device 100 may operate in the color sensor mode. In the color sensor mode, the color sensor 144 may collect the external light L information flowed through the hole O of the button structure 130 to generate the sensor value, and transmit the electrical signal corresponding to the generated sensor value to the controller 170.

The controller 170 may generate the control signal for correcting the screen of the display apparatus 1 based on the electrical signal transmitted from the sensor module 140 and output the generated control signal to the display driver 152.

Figure 12:
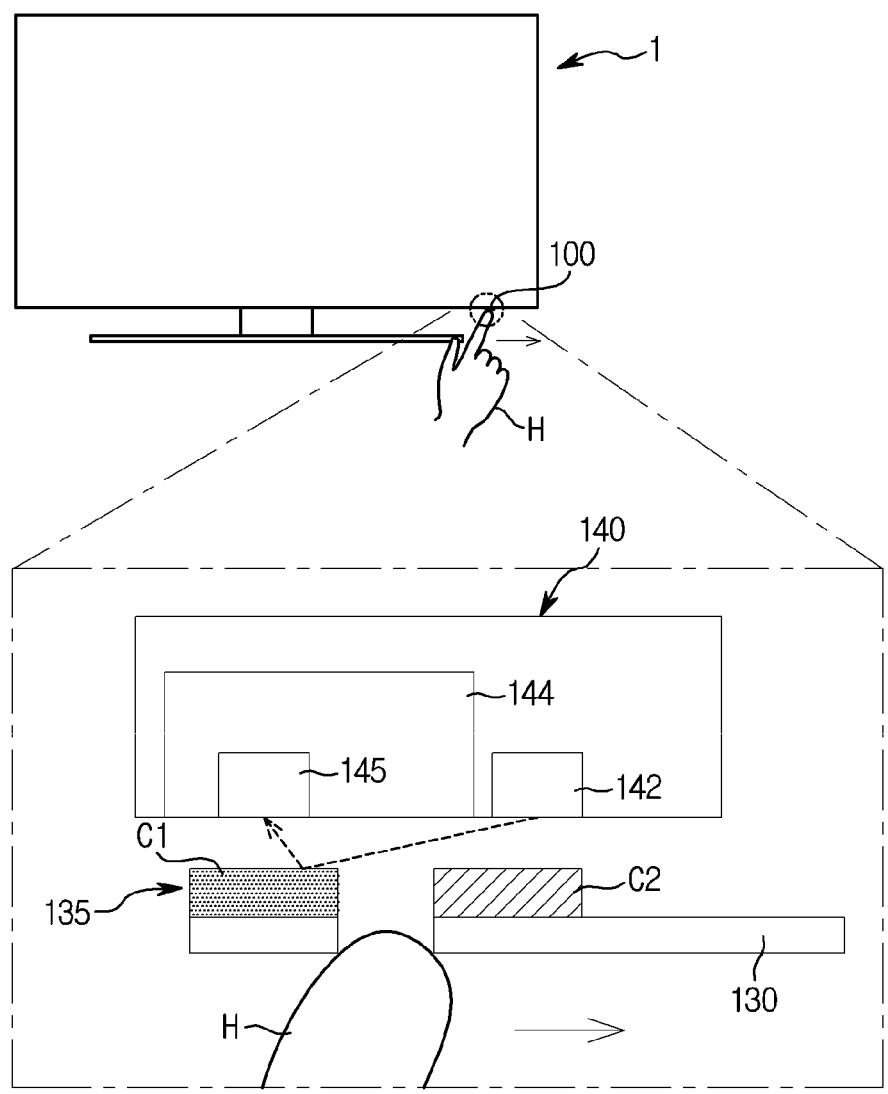
FIGS. 12 and 13 are views illustrating an operation principle in a case where the input device according to an embodiment operates in a button mode.
Figure 13:
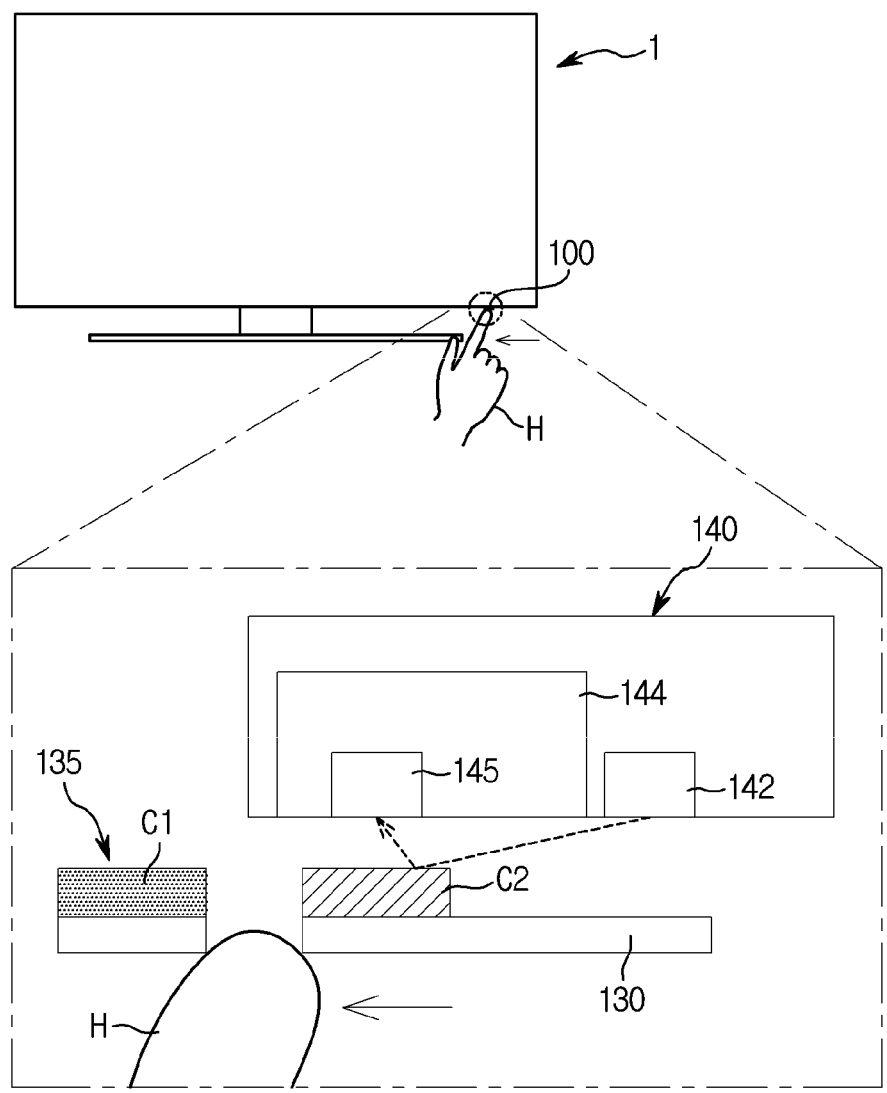

FIGS. 12 and 13 are views illustrating an operation principle in a case where the input device 100 according to an embodiment operates in button mode.

The button mode may refer to a mode in which the input device 100 receives the user's operation command in the predetermined direction. The input device 100 may operate in the button mode when the user operates the button structure 130, as shown in FIGS. 12 and 13.

Particularly, when the user operates the button structure 130, the user's hand H closes the hole O formed in the button structure 130. In other words, the external light flowing into the input device 100 through the hole O may be blocked, and the illuminance inside the input device 100 may approach zero. The controller 170 may switch the operation mode of the input device 100 to the button mode when it is determined that the ambient illuminance is equal to or less than the predetermined illuminance value based on the sensor value information of the sensor module 140. The controller 170 may switch the operation mode of the input device 100 to the button mode by controlling the operation of the light emitter 142.

In the button mode, the button structure 130 may be slid in the predetermined direction. For example, in the two-channel input device 100, the user may slide the button structure 130 in the left-right direction or the up-down direction. In the four-channel input device 100, the user may slide the button structure 130 in the up, down, left and right directions.

When the button structure 130 is moved by the user's operation, the color structures 135 coupled to the button structure 130 may move together. For example, as shown in FIG. 12, when the user moves the button structure 130 to the right, the color structure 135 coupled to the button structure 130 may be moved in the right direction together with the movement of the button structure 130. As shown in FIG. 13, when the user moves the button structure 130 in the left direction, the color structure 135 coupled to the button structure 130 may move in the left direction together with the movement of the button structure 130.

The light generated by the light emitter 142 may be incident on one of the plurality of color zones formed in the color structure 135, reflected and incident on the light receiver 145 of the color sensor 144. The color sensor 144 may generate another sensor value according to the color of the reflection surface on which the light incident on the light receiver 145 of the color sensor 144 is reflected, and the controller 170 may determine the intention of the user based on the sensor value of the color sensor 144.

Referring to FIG. 12, when the button structure 130 is moved in the right direction by the user's operation, the light generated by the light emitter 142 may be incident on the color zone C1 of the color structure 135, reflected and incident on the light receiver 145 of the color sensor 144. The light incident on the light receiver 145 of the color sensor 144 may generate the sensor value based on the color of the color zone C1. The controller 170 may detect the sensor value generated by the color sensor 144 and determine the moving direction of the button structure 130 and the intention of the user.

Referring to FIG. 13, when the button structure 130 is moved in the left direction by the user's operation, the light generated by the light emitter 142 may be incident on the color zone C2 of the color structure 135, reflected and incident on the light receiver 145 of the color sensor 144. The light incident on the light receiver 145 of the color sensor 144 may generate the sensor value based on the color of the color zone C2. The controller 170 may detect the sensor value generated by the color sensor 144 and determine the moving direction of the button structure 130 and the intention of the user.

Hereinafter, a control method of the display apparatus 1 will be described based on the operation principle of the display apparatus 1 described above.

FIG. 14 is a flowchart illustrating a method for controlling the display apparatus 1 according to an embodiment.

Referring to FIG. 14, the control method of the display apparatus 1 according to the embodiment may include operating the color sensor 144 (210), operating the input device 100 in the color sensor mode when the illuminance value detected by the color sensor 144 exceeds the predetermined illuminance value (220 and 230), and operating the input device 100 in the button mode when the illuminance value detected by the color sensor 144 is equal to or less than the predetermined illuminance value (220 and 240).

Operating the color sensor 144 may include an operation in which the color sensor 144 collects the ambient light. The color sensor 144 may generate the sensor value based on the light incident on the light receiver 145 provided in the color sensor 144 and output the generated sensor value to the controller 170 (210).

The controller 170 may detect the illuminance value of the light incident on the light receiver 145 of the color sensor 144 based on the sensor value information generated by the color sensor 144 (220), when the detected illuminance value exceeds the predetermined illuminance value, the input device 100 may be controlled to operate in the color sensor mode (230). When the detected illuminance value is equal to or less than the predetermined illuminance value, the input device 100 may be controlled to operate in the button mode.

The process of operating the input device 100 in the color sensor mode may include collecting the external light information at the color sensor 144 of the sensor module 140 and transmitting the sensor value generated by the color sensor 144 to the controller 170(231), and generating the control signal for correcting the display screen based on the sensor value information generated by the color sensor 144, by the controller 170 (232).

The color sensor 144 of the sensor module 140 may collect the external light information supplied to the inside of the input device 100 through the hole O formed in the button operator. The color sensor 144 is arranged to face the hole O of the button structure 130 so that the external light supplied to the inside of the input device 100 through the hole O may be incident on the color sensor 144 when the button operator is positioned in the neutral state.

The color sensor 144 may collect the external light information to generate the sensor value, and output the electrical signal corresponding to the generated sensor value to the controller 170.

The controller 170 may generate the control signal for correcting the display screen based on the electrical signal received from the color sensor 144. The display apparatus 1 may correct the screen of the display apparatus 1 based on the control signal generated by the controller 170.

The process in which the input device 100 operates in the button mode may include switching the light emitter 142 to the on state by the controller 170 (241). When the user operates the button operator of the input device 100, the light supplied to the inside of the input device 100 through the hole O of the button operator is blocked, and the controller 170 may supply the light to the inside of the input device 100 by switching the light emitter 142 to the on state when the illuminance value of the light detected by the color sensor 144 is equal to or less than the predetermined illuminance value.

Next, when the button structure 130 is moved in the predetermined direction by the user's operation, the light generated by the light emitter 142 may be incident on one of the plurality of color zones formed in the color structure 135, reflected and incident on the light receiver 145 of the color sensor 144. The sensor module 140 may generate a different sensor value according to the color of the light incident on the light receiver 145 of the color sensor 144. The color sensor 144 may collect the reflected light reflected from the color structure 135 to generate the sensor value, and output the electrical signal corresponding to the generated sensor value to the controller 170(242).

The controller 170 may determine the moving direction of the button structure 130 based on the electrical signal received from the color sensor 144 and generate the control signal for controlling the display screen display (243).

The display apparatus 1 may provide the display screen based on the control signal generated by the controller 170 (244). For example, according to the user's operation command input to the button operator, the display apparatus 1 may display the cover provided on the display screen by moving the left or right direction.

As is apparent from the above description, a single inputter is provided in the display apparatus and the color sensor applied to the inputter is used to collect illuminance information necessary for the display screen correction, and used as one of button structures for operating the display screen so as to provide a simplified button structure of the display apparatus.

Also, it is possible to reduce the cost by not installing unnecessary buttons, and design excellence can be ensured.

While embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A display apparatus comprising:
    an input device including:
        a housing,
        a spring provided inside the housing,
        a button structure configured to be elastically supported by the spring to be movable, the button structure being formed with a hole and a color structure around the hole, and
        a sensor assembly disposed to be spaced apart from the button structure inside the housing, the sensor assembly including a light emitter configured to provide light and a color sensor configured to collect ambient light,
    a controller configured to generate a control signal based on sensor value information of the sensor assembly; and
    a display configured to provide a display based on the generated control signal.

2. The display apparatus according to claim 1, wherein the color structure is configured to be formed on a back surface of the button structure.

3. The display apparatus according to claim 1, wherein the sensor assembly is provided such that a light emitting surface of the light emitter and a light receiving surface of the color sensor are arranged to face the color structure.

4. The display apparatus according to claim 1, wherein the color structure comprises a plurality of color zones.

5. The display apparatus according to claim 1, wherein the button structure is configured to move in a plurality of directions including left and right directions with respect to a front surface of the display apparatus.

6. The display apparatus according to claim 1, wherein the controller is configured to generate at least one control signal among control signals to correct the display and generate the control signal which controls the display based on the sensor value information of the sensor assembly.

7. The display apparatus according to claim 1, wherein the color sensor is configured to collect external light through the hole, and
wherein the controller is configured to generate the control signal to control the display based on the sensor value information of the sensor assembly generated by the external light.

8. The display apparatus according to claim 1, wherein the controller is configured to switch an operation mode of the input device to a button mode when illuminance of the ambient light is determined to be equal to or less than a predetermined illuminance value based on the sensor value information of the sensor assembly.

9. The display apparatus according to claim 8, wherein switching the operation mode of the input device to the button mode comprises controlling the light emitter to operate.

10. The display apparatus according to claim 1, wherein the controller is configured to determine a moving direction of the button structure based on the sensor value information of the sensor assembly and generate the control signal to control the display when the button structure is moved according to a user's operation.

11. The display apparatus according to claim 1, wherein the color structure is configured to move together with the button structure when the button structure is moved according to a user's operation, and
wherein the light emitter is configured such that light generated in the light emitter is reflected by the color structure and the light reflected is incident on the color sensor.

12. A method for controlling a display apparatus having an input device comprising:
generating at least one control signal to correct a display of the display apparatus; and
controlling a display of the display apparatus based on the at least one control signal generated and sensor value information,
wherein the input device comprises:
a housing,
a spring provided on an inner wall of the housing,
a button structure configured to be elastically supported by the spring to be movable, the button structure being formed with a hole and a color structure around the hole, and
a sensor assembly disposed to be spaced apart from the button structure inside the housing, the sensor assembly including a light emitter configured to provide light and a color sensor configured to collect ambient light,
wherein the sensor assembly provides the sensor value information for the controlling of display of the display apparatus.

13. The method according to claim 12, wherein the color sensor is configured to collect external light through the hole, and
wherein the generating of the at least one control signal to correct the display based on the sensor value information of the sensor assembly comprises:
generating the at least one control signal to correct the display based on the sensor value information of the color sensor generated by the external light.

14. The method according to claim 12, further comprising:
switching an operation mode of the input device to a button mode when illuminance of the ambient light is determined to be equal to or less than a predetermined illuminance value based on the sensor value information of the sensor assembly.

15. The method according to claim 14, wherein the switching of the operation mode of the input device to the button mode comprises:
controlling the light emitter to operate.

16. The method according to claim 12, wherein the button structure is configured to move in a plurality of directions including left and right directions with respect to a front surface of the display apparatus, and
wherein the generating of the at least one control signal to control the display based on the sensor value information of the sensor assembly comprises:
determining a moving direction of the button structure based on the sensor value information of the sensor assembly and generating the at least one control signal to control the display when the button structure is moved according to a user's operation.

* * * * *